United States Patent [19]
Loftis et al.

[11] Patent Number: 5,213,389
[45] Date of Patent: May 25, 1993

[54] VEHICLE SUN VISORS

[76] Inventors: Billy G. Loftis, 1701 E. Main; James W. Sartin, 1218 Monroe Dr., both of Shawnee, Okla. 74801

[21] Appl. No.: 803,840

[22] Filed: Dec. 9, 1991

[51] Int. Cl.⁵ .............................................. B60J 3/02
[52] U.S. Cl. ................................. 296/97.7; 296/97.8; 296/97.9; 248/282
[58] Field of Search .................. 296/97.1, 97.6–97.8, 296/97.5, 97.9, 97.11–97.13; 248/282, 289.1

[56] References Cited

U.S. PATENT DOCUMENTS

| | | | |
|---|---|---|---|
| 1,814,293 | 7/1931 | Christie | 296/97.8 X |
| 2,634,161 | 4/1953 | Beets | 296/97.11 |
| 2,747,927 | 5/1956 | Burkhead | 296/97.8 |
| 3,584,910 | 6/1971 | Lupul | 296/97.8 X |
| 4,171,845 | 10/1979 | Hirsch | 296/97.4 |
| 4,666,205 | 5/1987 | Nakagawa | 296/97.9 X |
| 4,679,842 | 7/1987 | Hwang-Change | 296/97.11 |
| 4,762,358 | 8/1988 | Levosky et al. | 296/97.7 |
| 4,923,238 | 5/1990 | Morgulis et al. | 296/97.8 X |
| 5,005,895 | 4/1991 | Muyres et al. | 296/97.8 |
| 5,038,844 | 8/1991 | Edmonds et al. | 296/97.8 X |
| 5,098,149 | 3/1992 | Lee | 296/97.8 X |

Primary Examiner—Dennis H. Pedder
Attorney, Agent, or Firm—Robert K. Rhea

[57] ABSTRACT

Sun visors and anti-glare shields are formed by connecting a reel of film in pull-down fashion to the upper edge portion of a vehicle conventional sun visor. When pulled down, the depending edge of the film is attached to the upper surface of the dash and a additional reel of film is disposed between the two visor connected sections of film to occlude light glare between the pull-down visor connected shields. Cantilever supported auxiliary sun visors are connected in piggy-back fashion with the respective permanent sun visor for swinging movement toward and away from the glass of vehicle front doors and each includes a reel of film mounted similarly thereon in pull-down fashion for shielding the light glare through vehicle front door windows. Additionally, accordion folded material extends between the adjacent end surfaces of the respective permanent sun visor and auxiliary sun visor at respective front door positions of the vehicle.

1 Claim, 2 Drawing Sheets

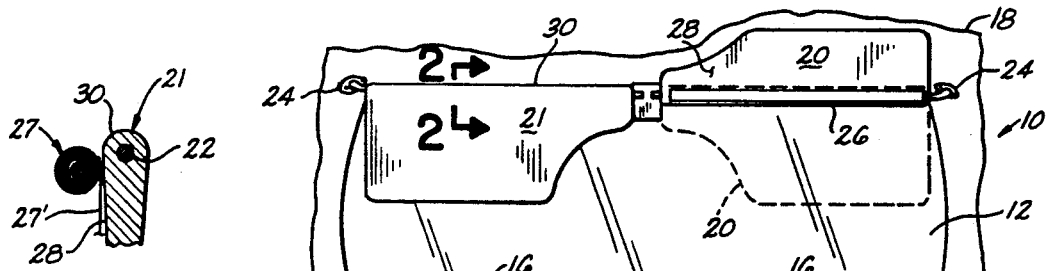
FIG. 1
FIG. 2
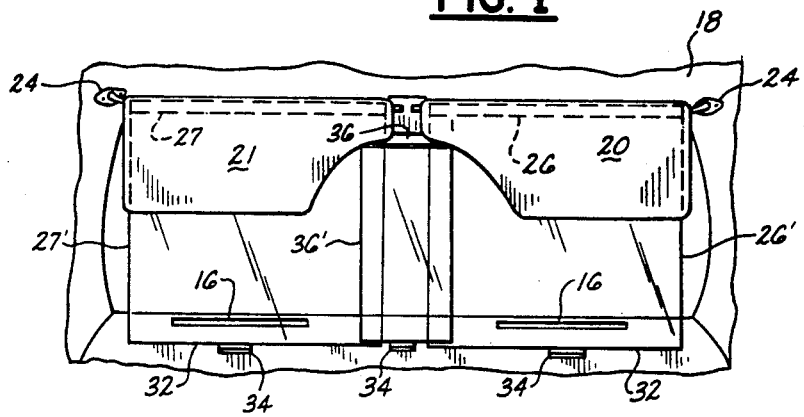
FIG. 3
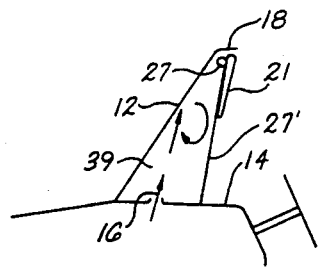
FIG. 4
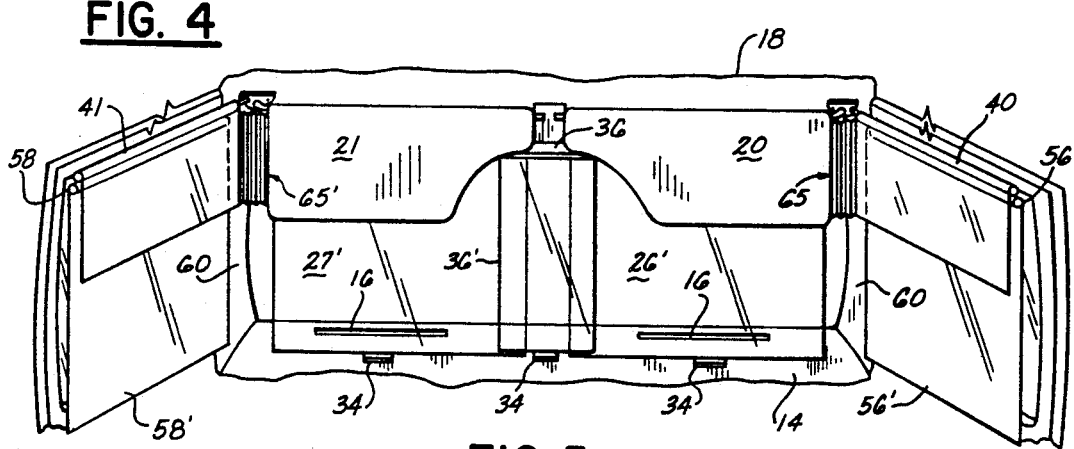
FIG. 5

VEHICLE SUN VISORS

BACKGROUND OF THE INVENTION

1. Field of the invention

This invention relates to automotive accessories and more particularly to sun visors which minimize sun glare in the control area of vehicles.

Vehicle sun visors provided as standard equipment in the control area of vehicles are generally satisfactory in reducing the glare of on coming headlights or to some extent the glare of sun reflection of sun rays off road surfaces or windshields of approaching or preceding vehicles through the windshield or vehicle front side glasses. However, these visors are of limited area and are not movable to occlude sun glare in areas of the windshield or door glasses not covered by the conventional sun visors.

This invention obviates the problem of sun glare through vehicle windshield or side glasses in an area of substantially 180° with respect to the driver and front seat passenger.

2. Description of the prior art

Supplemental panels formed from transparent tinted material for minimizing sun or headlight glare are well known and have usually been attached to the conventional sun visor as a rider or temporarily attached to the inside surface of vehicle glass by a suction cup or the like to occlude sun or light glare into the control area.

While these tinted panels generally perform satisfactorily they have the disadvantage that they are limited in area of coverage and must be moved when the travel direction of the vehicle has changed with respect to the source of light.

This results in a distraction of the operator controlling the vehicle or, in some instances it is inconvenient for him to move such panel.

U.S. Pat. No. 2,634,161 discloses a pair of vehicle sun visors pivotally and swingably mounted about a common vertical support for movement in light shielding a forward windshield and a side front door glass.

U.S. Pat. No. 4,679,842 discloses a ceiling supported pull-down glare shield extending coextensive with the vertical inside dimension of a vehicle windshield which is temporarily fastened to the upper surface of the dash.

This invention obviates the above problems and is distinctive over the above patents by providing pull-down tinted film attached in piggy-back fashion to retractable conventional sun visors and additionally provide an auxiliary visor with a retractable pull-down tinted film which may be placed over the position of vehicle forward side windows.

SUMMARY OF THE INVENTION

A window blind-type reel of transparent flexible transparent tinted sunlight glare minimizing film coextensive with the length of a conventional vehicle sun visor is attached to its depending forward edge portion when in stored position to be pulled down and secured to the vehicle instrument panel or dash when needed to occlude sun or vehicle light glare.

Vehicle front side window visors similarly having a reel of light glare minimizing film attached thereto is pivotally supported in cantilever fashion by the primary visor bracket mounting in piggy-back fashion with respect to the conventional sun visor for swinging movement toward and away from the vehicle front side windows.

Other light glare panels shield the spacing between the conventional visors and side window visors and the windshield area below the rearview mirror.

The principal object of this invention is to minimize light glare in the control area of a vehicle throughout a substantially 180° arc with respect to the position of the vehicle operator.

BRIEF DESCRIPTION OF THE DRAWINGS

FIG. 1 is a fragmentary interior elevational view of a vehicle windshield illustrating conventional sun visors in raised and lowered positions;

FIG. 2 is a vertical cross sectional view, to a larger scale, taken substantially along the line 2—2 of FIG. 1;

FIG. 3 is an elevational view, similar to FIG. 1, illustrating sun visor attached film in lowered position;

FIG. 4 is a diagrammatic view of the visors illustrated by FIG. 3;

FIG. 5 is a view, similar to FIG. 3, illustrating auxiliary vehicle forward door window visors in light shielding position;

DESCRIPTION OF THE PREFERRED EMBODIMENT

Figure 6:
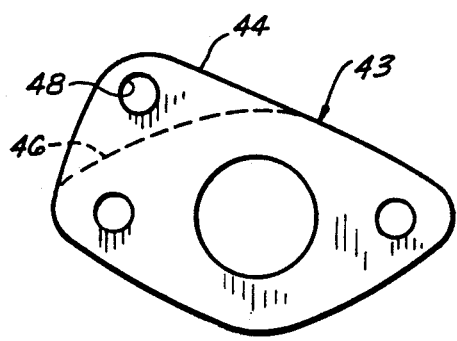
FIG. 6 is a top plan view of an auxiliary sun visor mounting bracket adaptor.

Like characters of reference designate like parts in those figures of the drawings in which they occur.

In the drawings:

The reference numeral 10 indicates the forward inside area of an automotive vehicle having a front windshield 12, a dash panel 14 equipped with windshield defroster vent openings 16 adjacent the inward depending limit of the windshield 12. The numeral 18 indicates the forward roof area of the vehicle spanning the upper edge limit of the windshield 12.

Conventional right and left sun visors 20 and 21, respectively, are supported by rods 22 having one end portion secured to the inner surface of the vehicle forward roof area by mounting brackets 24.

The above description is substantially conventional with most automotive vehicles presently in use and is set forth to show the combination with which the invention is used.

In caring out the invention, window blind type reels of transparent color tinted film 26 and 27 are horizontally secured longitudinally to the normally forwardly disposed surface 28 of the respective visor 20 and 21 adjacent its upper edge limit 30.

Transversely, the width of the film 26-27 is slightly less than the longitudinal length of the respective visor and the length of the film is such that it may extend downwardly from its reeled up position and fastened at its lower edge limit 32 to the upper surface of the dash 14 as by any suitable fastener, such as the self adhering material 34 presently marketed under the trademark VELCRO, rearwardly of the defroster vents 16.

Additionally, a third reel of tinted film 36 of substantially less length than the reels 26-27, is secured to the upper inward surface of the windshield 12 forwardly of the position of the rearview mirror for the purpose of spanning the spacing between the films 26' and 27'0 when pulled down from the respective right and left reels 26 and 27 (FIG. 5) and occluding any sun or vehicle light shining through the windshield on the driver's or passenger's eyes.

When the three lowered films 26', 27' and 36' are secured to the dash 14, a space or compartment 39 (FIG. 4) is formed between the films and the inner surface of the windshield 12 which aids in maintaining the defroster heat adjacent the windshield in inclement weather.

Additionally, the vehicle right and left front door windows, not shown, are provided with a pair of auxiliary visors 40 and 41, respectively, which are mounted in piggy-back fashion on the respective conventional visor 20 and 21 by swinging arm bracket adaptor means 43 interposed between the sun visor brackets 24 and the inner surface of the vehicle forward roof portion 18.

Figure 8:
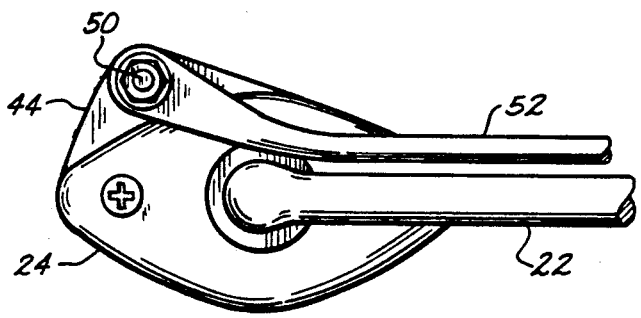
Figure 7:
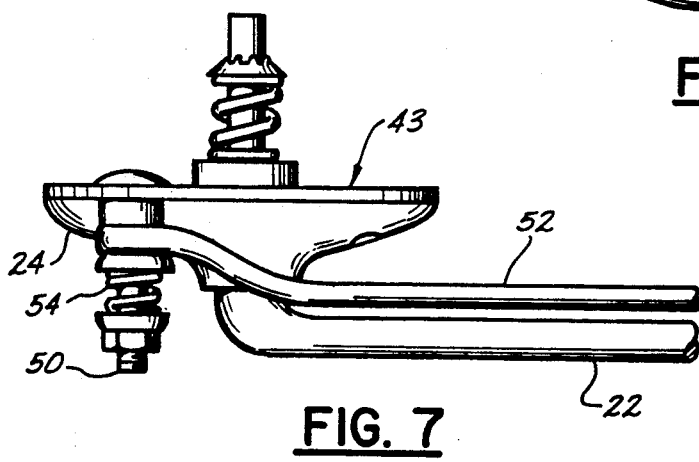
FIG. 7 is an elevational view illustrating the auxiliary visor mounting bracket adaptor in operative position, and, FIG. 8 is a bottom view of FIG. 7.

The conventional visor bracket 24 is preferably constructed as shown by FIGS. 7 and 8. The bracket means 43 comprises an extension 44 added to a plate 43 having a perimeter and apertures matching the visor brackets 24 outwardly of the dotted line 46 and apertured as at 48. A depending pivot bolt 50 in the aperture 48 journals an auxiliary visor bracket arm 52 for horizontal swinging movement about the bolt 50 axis from a position parallel with the respective sun visor 20 and 21 to a lateral position adjacent the upper inner limit of the vehicle respective front side door, not shown.

A spring 54 interposed between the pivot bolt nut and swinging arm 52 maintains the arm 52 horizontal and permits free horizontal movement and frictional resistance between components for maintaining the auxiliary visor in its respective positions.

The auxiliary sun visors 40 and 41 are mounted in the usual conventional fashion on the respective pivoting arm 52 and when laterally disposed as illustrated by FIG. 5, shield the upper edge limit of the respective door glass.

The auxiliary sun visors, 40 and 41, are similarly provided with reels 56 and 58, of similar transparent tinted film 62 and 63 having a width substantially equal to the length of the respective auxiliary visor 40 and 41 and a length sufficient to span the principal portion of the respective vehicle right and left forward door glass when in lowered position as at 56' and 58' (FIG. 5).

The area or space 60 formed by the confronting edges of the film 26'-56' and 27'-58', is spanned at its upper end portion between the sun visors 20-40 and 21-41, by lengths of accordion folded material 65-65' bonded at their respective ends to the respective sun visor 20-40 and 21-41 which occludes sun rays or head lights from entering the vehicle forward compartment through the upper portion of the spaces 60.

The sun visors and respective films, as illustrated by FIG. 5, surround substantially 180° of the position of the vehicle operator and his passenger. It is believed obvious that any or all of the antiglare shields 26', 27', 36', 56' and 58' may be disposed as illustrated by FIG. 5 to act as a heat shield against sun rays.

Obviously the invention is susceptible to changes or alterations without defeating its practicability. Therefore, we do not wish to be confined to the preferred embodiment shown in the drawings and described herein.

We claim:

1. In a vehicle having a windshield having opposing ends and extending upward and rearwardly above a dash panel and a glass equipped front door adjacent the respective end of the windshield and having a support bracket attached to the vehicle above each respective end of the windshield and a permanent generally planar sun visor suspended from each said support bracket for vertical swinging movement of the visor about a horizontal axis adjacent an upper edge limit of the vehicle windshield, said sun visors having first and second surfaces, a horizontal upper edge, a horizontal lower edge and opposing end edges, the improvement comprising:

film reel means including first and second rolls of transparent tinted film horizontally attached substantially coextensively to the first surface of each said sun visor for paying out and retracting a length of the film spanning a major portion of the respective end of the windshield; and, fastening means including cooperative pairs of self adhering members attached respectively to an end edge of the respective payed out film and the upper surface of said dash panel for temporarily attaching the film edge to the dash panel;

an auxiliary bracket interposed between each said support bracket and the vehicle;

a pivot bolt depending vertically from the auxiliary bracket;

an elongated horizontally disposed auxiliary visor arm having an aperture in one end portion pivotally surrounding an intermediate portion of said bolt for horizontal pivoting movement about the vertical axis of the bolt;

an auxiliary sun visor having opposing planar surfaces and attached to said auxiliary arm for vertical movement about the horizontal axis of the auxiliary arm and horizontal swinging movement with the auxiliary arm about the vertical axis of the bolt toward and away from the vehicle respective front door glass;

film reel means including third and fourth rolls of transparent tinted film respectively horizontally attached substantially coextensively to one surface of each said auxiliary sun visor for paying out and retracting a length of the film spanning at least a major portion of the vertical dimension of the respective vehicle front door glass;

a fifth reel of film having a length transversely spanning the windshield area between said first and second payed out film and secured horizontally between said first and second reels of film;

other fastening means including a cooperative pair of self adhering members attached respectively to an end edge of the payed out fifth reel film and the upper surface of said dash panel for temporarily attaching the last named film edge to the dash panel; and, a length of accordion folded material having opposing ends extending between and coextensively bonded at its respective ends to the adjacent end portion of each said sun visor and the adjacent end portion of the respective said auxiliary sun visor and vertically moveable therewith when in an unused position and forming a combination with the sun visors and auxiliary sun visors for shielding the windshield and front door glasses with respect to occupants of a vehicle when in a driver and passenger position, respectively.

* * * * *